Aug. 15, 1944. W. E. WHITE 2,355,767
CLIP
Filed Sept. 16, 1942
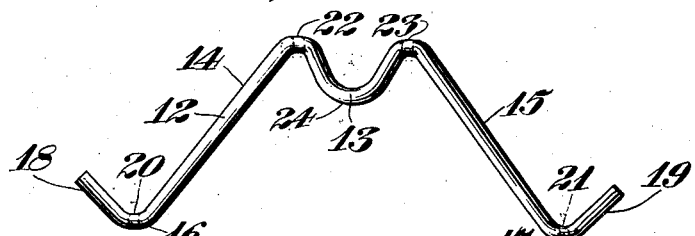
Fig. 1.
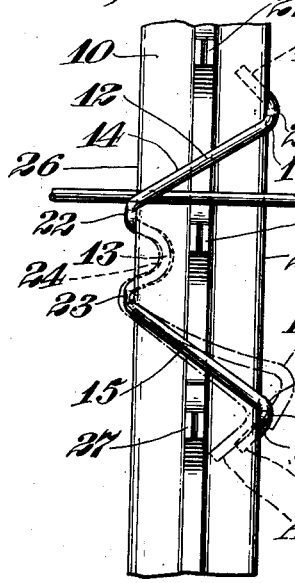
Fig. 2.
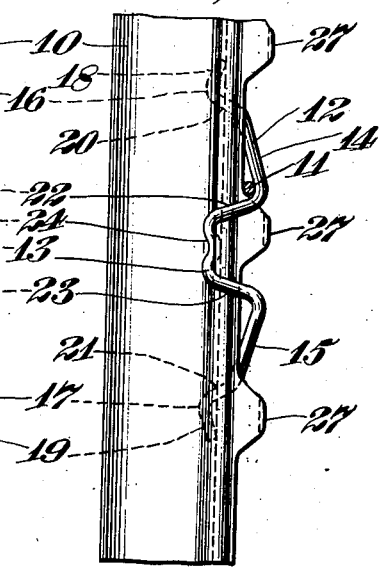
Fig. 5. Fig. 6.
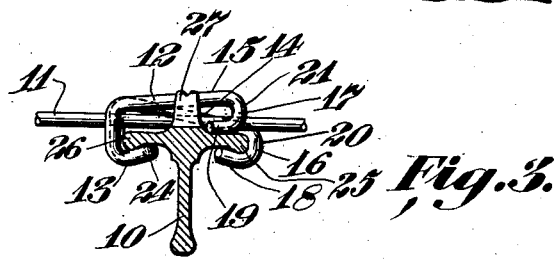
Fig. 3.
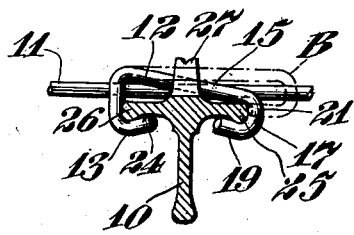
Fig. 4.
Inventor
William E. White.
By R. S. C. Dougherty.
Attorney Patented Aug. 15, 1944

2,355,767

UNITED STATES PATENT OFFICE 2,355,767

CLIP

William E. White, Bethlehem, Pa., assignor to Bethlehem Steel Company, a corporation of Pennsylvania Application September 16, 1942, Serial No. 458,509

4 Claims. (Cl. 256—48)

My invention relates to clips and more particularly to wire clips for attaching fencing to supports.

One of the objects of my invention is to provide a clip which can easily be applied to a post without the use of tools and which is superior in holding strength to those of the prior art.

Another object of my invention is to provide a clip which is useful to effectively secure wires of different diameters to a post.

Another object of my invention is to provide a clip which is readily reversible and which can be applied to a member with equal ease either right or left handed.

A still further object of my invention is to provide a resilient clip which can be applied in gripping relation to a post to effectively retain a member thereon and which can be removed and reapplied to a post without destroying its effectiveness.

The novel features of my invention will be more fully understood from the following description and claims taken with the accompanying drawings, in which:

Figure 1 is a side view of my clip in its normal condition;

Fig. 2 is a side view of my clip showing its application to a post;

Fig. 3 is a bottom view of my clip showing a step in its application to a post;

Fig. 4 is a bottom view of my clip showing it fully applied to a post;

Fig. 5 is an end view of my clip applied to a post; and

Fig. 6 is a view of my clip showing the end of the clip opposite to that shown in Fig. 5.

Referring now more particularly to the drawing, 10 designates a T-post which supports a fence wire 11 by means of my novel clip 12. The clip 12 as shown in Fig. 1 is made of spring wire and is formed approximately in the shape of a V with the apex turned back upon itself to provide an intermediate hook portion 13. Legs 14 and 15 diverge from the hook portion 13 and terminate in end hook portions 16 and 17, respectively, which comprise terminal retaining members 18 and 19 respectively. By referring to Fig. 4, which shows the bottom, and Fig. 5 which shows the end configuration of the clip, it will be noted that the end hook portions 16 and 17 also comprise flange-gripping portions 20 and 21 respectively. These flange-gripping portions 20 and 21 preferably have substantially reverse curve formation and connect diverging legs 14 and 15 with terminal retaining members 18 and 19 respectively. The intermediate hook portion 13 comprises a flange-gripping portion 22 and 23 extending from each of said legs 14 and 15 which are preferably substantially straight and a retaining member 24 which is preferably arcuate in form and which connects the flange-gripping portions.

In Figure 2, I show my clip 12 applied to the post 10 which comprises flanges 25 and 26, and lugs 27 and also the clip in several different positions during its application. In applying my clip 12, to the post 10, the wire 11, which may be a single wire or a wire of a fabricated fencing is placed across the face of the post 10 immediately above one of the lugs 27 and the end portion 16 of the clip 12 is hooked over flange 25 of post 10 above the wire 11. The intermediate portion 13 is next hooked over the flange 26 below the wire 11 with the diverging leg 14 passing over the wire 11. The diverging leg 15 and the hook portion 17 are now in the position shown in chain line (Fig. 2) designated A. The diverging leg 15 is then forced toward the diverging leg 14 until the end of the retaining portion 19 of the hook portion 17 engages the edge of the flange 25 of post 10, as shown in chain line (Fig. 2) designated B. The forcing of the leg 15 to this position distorts the clip 12. The leg 15 of the clip is then forced inwardly until the terminal retaining portion 19 passes beyond the edge of the flange 25. As soon as the portion 19 passes beyond the edge of the flange 25 it will snap to the position shown in full lines in Fig. 2 behind the flange and the diverging leg 15 will assume the position shown in full lines (Fig. 2) designated C, due to the tendency of the clip to assume its normal shape. The flange-gripping portion 21 in this position grippingly engages the edge of flange 25. Because of the distortion of the clip during its application and its tendency to return in its applied position to its normal condition, end hooked portions 16 and 17, respectively, and the intermediate hooked portion 13 of the clip 12 will firmly grip the flanges of the post and thereby constitute an effective fastening device for securing members such as the wire 11 to the post 10.

When it is so desired, the clip may easily be removed from the post by rotating leg 15 in an anti-clockwise direction until hook portion 17 is opposite the edge of the flange 25 and then disengaging the clip in a clockwise direction.

The clip as described constitutes an effective device for attaching wire fencing to metallic flanged posts, as it will hold the wire slidingly to the post and will not prevent free horizontal movement across the face of the post.

My clip 12 is of such construction that its effectiveness in fastening fencing 11 relative to the post 10 is dependent upon the gripping action between the flange gripping portions 20 and 21 of the end hook portions 16 and 17 respectively, and the flange gripping portions 22 and 23 of the intermediate hook portion 13 with the opposite edges of the flanges of the post, and therefore the flange gripping portions of the intermediate hook portion may be made of a length sufficient to accommodate fencing wires of various diameters without affecting the efficiency of the clip.

It will be seen from the foregoing description that I have devised a simple clip which can be easily applied to and removed from a fence post. Furthermore, the stresses set up in applying and removing the clip are so distributed that no permanent distortion of the clip will occur, and it may be removed and reapplied many times without loss of efficiency.

While I have shown my invention in but one form, it will be obvious to those skilled in the art that it is not so limited, but is susceptible of various other changes and modifications without departing from the spirit thereof, and I desire therefore, that only such limitations shall be placed thereon as are imposed by the prior art or as are specifically set forth in the appended claims.

Having thus described my invention, what I claim as new and desire to secure by Letters Patent is:

1. A resilient wire clip comprising end hook portions, an intermediate hook portion, and diverging legs extending from and connecting said intermediate hook portion with said end hook portions, said hook portions having flange-gripping portions and inwardly disposed retaining members to engage the flanges of a post to which the clip is to be applied, the flange-gripping portions of said intermediate hook portion being of greater length than the flange-gripping portions of said end hook portions.

2. In combination with a flanged post, a preformed resilient wire clip comprising end hook portions, an intermediate hook portion, and diverging legs extending from and connecting said intermediate hook portion with said end hook portions, said intermediate hook portion comprising flange-gripping portions and an inwardly disposed retaining portion securing said clip to one of said flanges of said post and each of said end hook portions comprising a flange-gripping portion and an inwardly disposed retaining portion securing said clip to the other of said flanges of said post, the flange-gripping portions of said intermediate hook portion being of greater length than the flange-gripping portions of said end hook portions.

3. A spring wire clip comprising end hook portions, an intermediate hook portion, and legs diverging from and connecting said intermediate hook portion to said end hook portions, said intermediate hook portion comprising a straight portion extending from each of said legs and an inwardly disposed portion connecting said straight portions, said end hook portions comprising terminal portions angularly disposed to said legs and reverse curve portions connecting said terminal portions and said legs.

4. A spring wire clip comprising end hook portions, an intermediate hook portion, and legs diverging from and connecting said intermediate hook portion to said end hook portions, said end hook portions comprising terminal portions angularly disposed to said legs and reverse curve portions connecting said terminal portions and said legs.

WILLIAM E. WHITE.